United States Patent
Nguyen et al.

(10) Patent No.: US 7,032,667 B2
(45) Date of Patent: Apr. 25, 2006

(54) METHODS FOR ENHANCING THE CONSOLIDATION STRENGTH OF RESIN COATED PARTICULATES

(75) Inventors: Philip D. Nguyen, Duncan, OK (US); Johnny A. Barton, Marlow, OK (US)

(73) Assignee: Halliburtonn Energy Services, Inc., Duncan, OK (US)

( * ) Notice: Subject to any disclaimer, the term of this patent is extended or adjusted under 35 U.S.C. 154(b) by 259 days.

(21) Appl. No.: 10/659,574

(22) Filed: Sep. 10, 2003

(65) Prior Publication Data

US 2005/0051332 A1 Mar. 10, 2005

(51) Int. Cl.
*E21B 43/267* (2006.01)

(52) U.S. Cl. .................. 166/280.2; 166/281; 166/295; 428/507; 507/924

(58) Field of Classification Search ............... 166/276, 166/280.1, 280.2, 281, 295; 428/507; 507/924; 523/131
See application file for complete search history.

(56) References Cited

U.S. PATENT DOCUMENTS

| | | | |
|---|---|---|---|
| 2,238,671 A | 4/1941 | Woodhouse ................. 166/21 |
| 2,703,316 A | 3/1955 | Schneider ................. 260/78.3 |
| 2,869,642 A | 1/1959 | McKay et al | |
| 3,047,067 A | 7/1962 | Williams et al ............... 166/33 |
| 3,123,138 A | 3/1964 | Robichaux | |
| 3,176,768 A | 4/1965 | Brandt et al ................. 166/33 |
| 3,199,590 A | 8/1965 | Young | |
| 3,272,650 A | 9/1966 | MacVittie ..................... 134/7 |
| 3,297,086 A | 1/1967 | Spain | |
| 3,308,885 A | 3/1967 | Sandford | |
| 3,316,965 A | 5/1967 | Watanabe ..................... 166/33 |
| 3,375,872 A | 4/1968 | McLaughlin et al .......... 166/29 |
| 3,404,735 A | 10/1968 | Young, et al. | |
| 3,415,320 A | 12/1968 | Young ......................... 166/33 |
| 3,492,147 A | 1/1970 | Young et al ............... 177/62.2 |
| 3,659,651 A | 5/1972 | Graham ...................... 166/280 |
| 3,681,287 A | 8/1972 | Brown, et al. ................ 260/67 |
| 3,754,598 A | 8/1973 | Holloway, Jr. ............... 166/249 |
| 3,765,804 A | 10/1973 | Brandon ..................... 417/540 |
| 3,768,564 A | 10/1973 | Knox et al. ................. 166/307 |
| 3,784,585 A | 1/1974 | Schmitt et al. ............. 260/861 |
| 3,819,525 A | 6/1974 | Hattenbrun ................. 252/132 |
| 3,828,854 A | 8/1974 | Templeton et al. ......... 166/307 |

(Continued)

FOREIGN PATENT DOCUMENTS

CA 2063877 5/2003

(Continued)

OTHER PUBLICATIONS

U.S. Appl. No. 10/383,154, filed Mar. 6, 2003, Nguyen, et al.

(Continued)

*Primary Examiner*—George Suchfield
(74) *Attorney, Agent, or Firm*—Robert A. Kent; Baker Botts

(57) ABSTRACT

The present invention involves enhancing the conductivity of subterranean propped fractures penetrating formations while controlling proppant flowback. More particularly, the present invention relates to improved consolidation performance of resin-coated proppants and their use in controlling proppant flowback. Some embodiments of the present invention provide methods of controlling proppant flowback from a fracture in a subterranean zone comprising the steps of providing resin coated proppant; providing tackifying composition; coating the tackifying composition onto at least a portion of the resin coated proppant to create tackified resin coated proppant; introducing the tackified resin coated proppant into a subterranean fracture; and, allowing the tackified resin coated proppant to substantially cure.

8 Claims, 1 Drawing Sheet

U.S. PATENT DOCUMENTS

Figure 1:
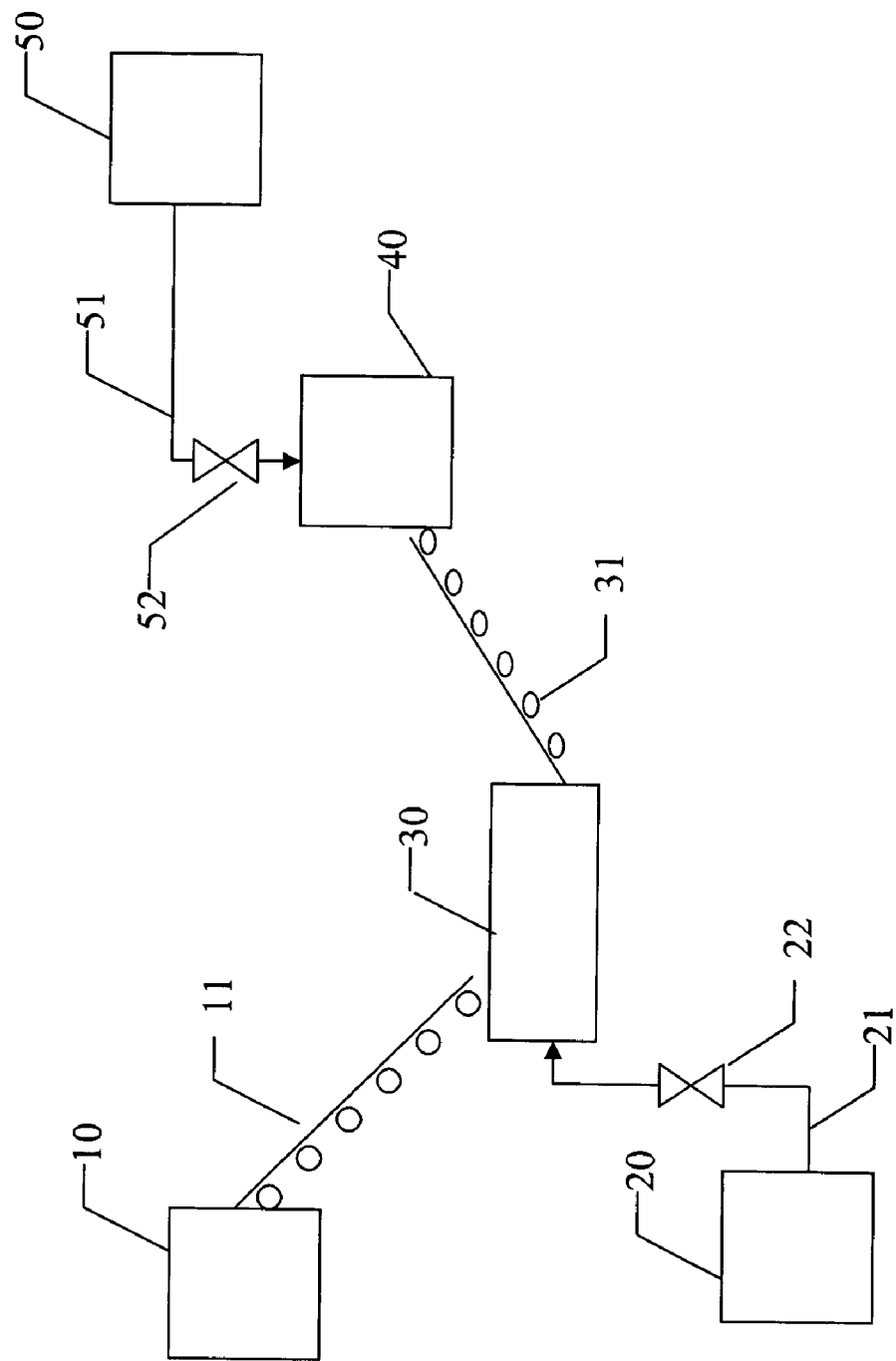

| Patent | | Date | Inventor | Class |
|---|---|---|---|---|
| 3,842,911 | A | 10/1974 | Know et al. | 166/307 |
| 3,854,533 | A | 12/1974 | Gurley et al. | 166/276 |
| 3,857,444 | A | 12/1974 | Copeland | 166/276 |
| 3,863,709 | A | 2/1975 | Fitch | 165/1 |
| 3,868,998 | A | 3/1975 | Lybarger et al. | 166/278 |
| 3,888,311 | A | 6/1975 | Cooke, Jr. | 166/280 |
| 3,912,692 | A | 10/1975 | Casey et al | 260/78.3 |
| 3,948,672 | A | 4/1976 | Harnsberger | 106/90 |
| 3,955,993 | A | 5/1976 | Curtice | 106/90 |
| 3,960,736 | A | 6/1976 | Free et al. | 252/8.55 R |
| 4,008,763 | A | 2/1977 | Lowe | 166/253 |
| 4,029,148 | A | 6/1977 | Emery | 166/250.1 |
| 4,031,958 | A | 6/1977 | Sandiford et al. | 166/270 |
| 4,042,032 | A | 8/1977 | Anderson et al. | 166/276 |
| 4,070,865 | A | 1/1978 | McLaughlin | 61/36 |
| 4,074,760 | A | 2/1978 | Copeland et al. | 166/276 |
| 4,169,798 | A | 10/1979 | DeMartino | 252/8.55 R |
| 4,172,066 | A | 10/1979 | Zweigle et al. | 260/29.6 TA |
| 4,245,702 | A | 1/1981 | Haafkens et al. | 166/307 |
| 4,273,187 | A | 6/1981 | Satter et al. | 166/250 |
| 4,291,766 | A | 9/1981 | Davies et al. | 166/281 |
| 4,305,463 | A | 12/1981 | Zakiewicz | 106/245 |
| 4,336,842 | A | 6/1982 | Graham et al. | 166/276 |
| 4,352,674 | A | 10/1982 | Fery | 23/230 |
| 4,353,806 | A | 10/1982 | Canter et al. | 507/229 |
| 4,387,769 | A | 6/1983 | Erbstoesser et al. | 166/295 |
| 4,415,805 | A | 11/1983 | Fertl et al. | 250/260 |
| 4,439,489 | A | 3/1984 | Johnson et al. | 428/404 |
| 4,443,347 | A | 4/1984 | Underdown et al. | 252/8.55 R |
| 4,460,052 | A | 7/1984 | Gockel | 175/72 |
| 4,470,915 | A | 9/1984 | Conway | 252/8.55 R |
| 4,493,875 | A | 1/1985 | Beck et al. | 428/403 |
| 4,494,605 | A | 1/1985 | Wiechel et al. | 166/288 |
| 4,498,995 | A | 2/1985 | Gockel | 252/8.5 LC |
| 4,501,328 | A | 2/1985 | Nichols | 166/280 |
| 4,526,695 | A | 7/1985 | Erbstoesser et al. | 252/8.55 R |
| 4,527,627 | A | 7/1985 | Graham et al. | 166/280 |
| 4,541,489 | A | 9/1985 | Wu | 166/312 |
| 4,546,012 | A | 10/1985 | Brooks | 427/213 |
| 4,553,596 | A | 11/1985 | Graham et al. | 166/295 |
| 4,564,459 | A | 1/1986 | Underdown et al. | 252/8.55 R |
| 4,572,803 | A | 2/1986 | Yamazoe et al. | 534/16 |
| 4,649,998 | A | 3/1987 | Friedman | 166/294 |
| 4,664,819 | A | 5/1987 | Glaze et al. | 252/8.551 |
| 4,665,988 | A | 5/1987 | Murphey et al. | 166/295 |
| 4,669,543 | A | 6/1987 | Young | 166/276 |
| 4,675,140 | A | 6/1987 | Sparks et al. | 264/4.3 |
| 4,683,954 | A | 8/1987 | Walker et al. | 166/307 |
| 4,694,905 | A | 9/1987 | Armbruster | 166/280 |
| 4,715,967 | A | 12/1987 | Bellis | 252/8.551 |
| 4,716,964 | A | 1/1988 | Erbstoesser et al. | 166/284 |
| 4,733,729 | A | 3/1988 | Copeland | 166/276 |
| 4,739,832 | A | 4/1988 | Jennings, Jr. et al. | 166/299 |
| 4,785,884 | A | 11/1988 | Armbruster | 166/280 |
| 4,787,453 | A | 11/1988 | Hewgill et al. | 166/272.3 |
| 4,789,105 | A | 12/1988 | Hosokawa et al. | 241/67 |
| 4,796,701 | A | 1/1989 | Hudson et al. | 166/278 |
| 4,797,262 | A | 1/1989 | Dewitz | 422/142 |
| 4,800,960 | A | 1/1989 | Friedman et al. | 166/276 |
| 4,809,783 | A | 3/1989 | Hollenbeck et al. | 166/307 |
| 4,817,721 | A | 4/1989 | Pober | 166/295 |
| 4,829,100 | A | 5/1989 | Murphey et al. | 523/131 |
| 4,838,352 | A | 6/1989 | Oberste-Padtberg et al. | 166/291 |
| 4,842,072 | A | 6/1989 | Friedman et al. | 166/295 |
| 4,843,118 | A | 6/1989 | Lai et al. | 524/555 |
| 4,848,467 | A | 7/1989 | Cantu et al. | 166/281 |
| 4,848,470 | A | 7/1989 | Korpics | 166/312 |
| 4,850,430 | A | 7/1989 | Copeland et al. | 166/276 |
| 4,886,354 | A | 12/1989 | Welch et al. | 356/70 |
| 4,888,240 | A | 12/1989 | Graham et al. | 428/403 |
| 4,895,207 | A | 1/1990 | Friedman et al. | 166/276 |
| 4,903,770 | A | 2/1990 | Friedman et al. | 166/288 |
| 4,934,456 | A | 6/1990 | Moradi-Araghi | 166/270 |
| 4,936,385 | A | 6/1990 | Weaver et al. | 166/288 |
| 4,942,186 | A | 7/1990 | Murphey et al. | 523/131 |
| 4,957,165 | A | 9/1990 | Cantu et al. | 166/295 |
| 4,959,432 | A | 9/1990 | Fan et al. | 526/287 |
| 4,961,466 | A | 10/1990 | Himes et al. | 166/250 |
| 4,969,522 | A | 11/1990 | Whitehurst et al. | 166/278 |
| 4,969,523 | A | 11/1990 | Martin et al. | 166/278 |
| 4,986,353 | A | 1/1991 | Clark et al. | 166/279 |
| 4,986,354 | A | 1/1991 | Cantu et al. | 166/279 |
| 4,986,355 | A | 1/1991 | Casad et al. | 166/295 |
| 5,030,603 | A | 7/1991 | Rumpf et al. | 501/127 |
| 5,049,743 | A | 9/1991 | Taylor, III et al. | 250/303 |
| 5,082,056 | A | 1/1992 | Tackett, Jr. | 166/295 |
| 5,107,928 | A | 4/1992 | Hilterhaus | 166/293 |
| 5,128,390 | A | 7/1992 | Murphey et al. | 523/130 |
| 5,135,051 | A | 8/1992 | Fracteau et al. | 166/104 |
| 5,142,023 | A | 8/1992 | Gruber et al. | 528/354 |
| 5,165,438 | A | 11/1992 | Facteau et al. | 137/1 |
| 5,173,527 | A | 12/1992 | Calve | 524/74 |
| 5,178,218 | A | 1/1993 | Dees | 166/281 |
| 5,182,051 | A | 1/1993 | Bandy et al. | 252/645 |
| 5,199,491 | A | 4/1993 | Kutts et al. | 166/276 |
| 5,199,492 | A | 4/1993 | Surles et al. | 166/295 |
| 5,211,234 | A | 5/1993 | Floyd | 166/276 |
| 5,216,050 | A | 6/1993 | Sinclair | 524/108 |
| 5,218,038 | A | 6/1993 | Johnson et al. | 524/541 |
| 5,232,955 | A | 8/1993 | Caabai et al. | 521/63 |
| 5,232,961 | A | 8/1993 | Murphey et al. | 523/414 |
| 5,238,068 | A | 8/1993 | Fredrickson | 166/307 |
| 5,247,059 | A | 9/1993 | Gruber et al. | 528/354 |
| 5,249,628 | A | 10/1993 | Surjaatmadia | 166/305 |
| 5,256,729 | A | 10/1993 | Kutta et al. | 524/700 |
| 5,273,115 | A | 12/1993 | Spafford | 166/281 |
| 5,285,849 | A | 2/1994 | Surles et al. | 166/295 |
| 5,293,939 | A | 3/1994 | Surles et al. | 166/295 |
| 5,295,542 | A | 3/1994 | Cole et al. | 166/278 |
| 5,306,998 | A | 4/1994 | Nakamura | 528/12 |
| 5,320,171 | A | 6/1994 | Laramay | 166/285 |
| 5,321,062 | A | 6/1994 | Landrum et al. | 523/141 |
| 5,325,923 | A | 7/1994 | Surjaatmadja et al. | 166/308 |
| 5,330,005 | A | 7/1994 | Card et al. | 166/280 |
| 5,332,037 | A | 7/1994 | Schmidt et al. | 166/276 |
| 5,335,726 | A | 8/1994 | Rodrogues | 166/295 |
| 5,351,754 | A | 10/1994 | Hardin et al. | 166/249 |
| 5,358,051 | A | 10/1994 | Rodrogues | 166/295 |
| 5,359,026 | A | 10/1994 | Gruber | 528/354 |
| 5,360,068 | A | 11/1994 | Sprunt et al. | 166/259 |
| 5,361,856 | A | 11/1994 | Surjaatmadja et al. | 175/67 |
| 5,363,916 | A | 11/1994 | Himes et al. | 166/276 |
| 5,373,901 | A | 12/1994 | Norman et al. | 166/300 |
| 5,381,864 | A | 1/1995 | Nguyen et al. | 166/280 |
| 5,386,874 | A | 2/1995 | Laramay et al. | 166/300 |
| 5,388,648 | A | 2/1995 | Jordan, Jr. | 166/380 |
| 5,393,810 | A | 2/1995 | Harris et al. | 524/56 |
| 5,396,957 | A | 3/1995 | Surjaatmadja et al. | 166/308 |
| 5,402,846 | A | 4/1995 | Jennings, Jr. et al. | 166/259 |
| 5,422,183 | A | 6/1995 | Sinclair et al. | 428/403 |
| 5,423,381 | A | 6/1995 | Surles et al. | 166/295 |
| 5,439,055 | A | 8/1995 | Card et al. | 166/280 |
| 5,460,226 | A | 10/1995 | Lawson et al. | 166/300 |
| 5,464,060 | A | 11/1995 | Hale et al. | 166/293 |
| 5,475,080 | A | 12/1995 | Gruber et al. | 528/354 |
| 5,484,881 | A | 1/1996 | Gruber et al. | 528/54 |
| 5,492,178 | A | 2/1996 | Nguyen et al. | 166/276 |
| 5,494,103 | A | 2/1996 | Surjaatmadja et al. | 166/222 |
| 5,497,830 | A | 3/1996 | Boles et al. | 166/300 |
| 5,498,280 | A | 3/1996 | Fistner et al. | 106/19 |
| 5,499,678 | A | 3/1996 | Surjaatmadja et al. | 166/298 |
| 5,501,274 | A * | 3/1996 | Nguyen et al. | 166/276 |
| 5,501,275 | A | 3/1996 | Card et al. | 166/280 |

| Patent | Date | Inventor | Class |
|---|---|---|---|
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Suries et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 507/219 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,697,440 A | 12/1997 | Weaver et al. | 166/281 |
| 5,698,322 A | 12/1997 | Tsai et al. | 428/373 |
| 5,712,314 A | 1/1998 | Surles et al. | 521/41 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A * | 8/1998 | Weaver et al. | 166/280.2 |
| 5,791,415 A | 8/1998 | Nguyen et al. | 166/280 |
| 5,799,734 A | 9/1998 | Norman et al. | 166/278 |
| 5,806,593 A | 9/1998 | Suries | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |
| 5,839,510 A * | 11/1998 | Weaver et al. | 166/276 |
| 5,849,401 A | 12/1998 | El-Afandi et al. | 428/215 |
| 5,849,590 A | 12/1998 | Anderson, II et al. | 436/27 |
| 5,853,048 A * | 12/1998 | Weaver et al. | 166/279 |
| 5,864,003 A * | 1/1999 | Qureshi et al. | 528/141 |
| 5,865,936 A * | 2/1999 | Edelman et al. | 156/310 |
| 5,871,049 A * | 2/1999 | Weaver et al. | 166/276 |
| 5,873,413 A * | 2/1999 | Chatterji et al. | 166/293 |
| 5,875,844 A * | 3/1999 | Chatterji et al. | 166/293 |
| 5,875,845 A * | 3/1999 | Chatterji et al. | 166/293 |
| 5,875,846 A * | 3/1999 | Chatterji et al. | 166/293 |
| 5,893,383 A * | 4/1999 | Fracteau | 137/14 |
| 5,893,416 A * | 4/1999 | Read | 166/304 |
| 5,908,073 A * | 6/1999 | Nguyen et al. | 166/276 |
| 5,911,282 A * | 6/1999 | Onan et al. | 175/72 |
| 5,916,933 A * | 6/1999 | Johnson et al. | 523/208 |
| 5,921,317 A * | 7/1999 | Dewprashad et al. | 166/208 |
| 5,924,488 A * | 7/1999 | Nguyen et al. | 166/280 |
| 5,929,437 A * | 7/1999 | Elliott et al. | 250/259 |
| 5,944,105 A * | 8/1999 | Nguyen | 166/278 |
| 5,945,387 A * | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,880 A * | 10/1999 | Nguyen et al. | 166/280 |
| 5,964,291 A * | 10/1999 | Bourne et al. | 166/279 |
| 5,969,006 A * | 10/1999 | Onan et al. | 523/166 |
| 5,977,283 A * | 11/1999 | Rossitto | 528/44 |
| 5,994,785 A * | 11/1999 | Higuchi et al. | 527/789 |
| RE36,466 E | 12/1999 | Nelson et al. | 166/280 |
| 6,003,600 A * | 12/1999 | Nguyen et al. | 166/281 |
| 6,004,400 A * | 12/1999 | Bishop et al. | 134/2 |
| 6,006,835 A * | 12/1999 | Onan et al. | 166/295 |
| 6,006,836 A * | 12/1999 | Chatterji et al. | 166/295 |
| 6,012,524 A * | 1/2000 | Chatterji et al. | 166/295 |
| 6,016,870 A * | 1/2000 | Dewprashad et al. | 166/295 |
| 6,024,170 A * | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/295 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/293 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacon et al. | 424/489 |
| 6,124,246 A | 9/2000 | Heathman et al. | 507/219 |
| 6,130,286 A | 10/2000 | Thomas et al. | 524/507 |
| 6,135,987 A | 10/2000 | Tsai et al. | 604/365 |
| 6,140,446 A | 10/2000 | Fujiki et al. | 528/15 |
| 6,148,911 A | 11/2000 | Gipson et al. | 166/248 |
| 6,152,234 A | 11/2000 | Newhouse et al. | 166/403 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,187,834 B1 | 2/2001 | Thayer et al. | 522/15 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1* | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |
| 6,231,664 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,311,773 B1 | 11/2001 | Todd et al. | 166/280 |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |
| 6,330,917 B1 | 12/2001 | Chatterji et al. | 166/295 |
| 6,350,309 B1 | 2/2002 | Chatterji et al. | 106/677 |
| 6,357,527 B1 | 3/2002 | Norman et al. | 166/300 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |
| 6,367,549 B1 | 4/2002 | Chatterji et al. | 166/292 |

| | | | | | | |
|---|---|---|---|---|---|---|
| 6,372,678 B1 | 4/2002 | Youngsman et al. ......... 504/128 | 2003/0131999 A1 | 7/2003 | Nguyen et al. ............. 166/280 |
| 6,376,571 B1 | 4/2002 | Chawla et al. ................. 522/64 | 2003/0148893 A1 | 8/2003 | Lungofer et al. ............ 507/200 |
| 6,387,986 B1 | 5/2002 | Moradi-Araghi et al. ... 523/211 | 2003/0186820 A1 | 10/2003 | Thesing ....................... 507/200 |
| 6,390,195 B1 | 5/2002 | Nguyen et al. .............. 166/276 | 2003/0188766 A1 | 10/2003 | Banerjee et al. ............... 134/7 |
| 6,401,817 B1 | 6/2002 | Griffith et al. .............. 166/295 | 2003/0188872 A1 | 10/2003 | Nguyen et al. ............. 166/308 |
| 6,405,797 B1 | 6/2002 | Davidson et al. ........... 166/249 | 2003/0196805 A1 | 10/2003 | Boney et al. ................ 166/280 |
| 6,406,789 B1 | 6/2002 | McDaniel et al. .......... 428/403 | 2003/0205376 A1 | 11/2003 | Ayoub et al. ............. 166/254.2 |
| 6,408,943 B1 | 6/2002 | Schultz et al. .............. 166/285 | 2003/0230408 A1 | 12/2003 | Acock et al. ................ 166/297 |
| 6,422,314 B1 | 7/2002 | Todd et al. .................. 166/312 | 2003/0234103 A1 | 12/2003 | Lee et al. .................... 166/293 |
| 6,439,309 B1 | 8/2002 | Matherly et al. ............ 166/276 | 2004/0000402 A1 | 1/2004 | Nguyen et al. ............. 166/280 |
| 6,439,310 B1 | 8/2002 | Scott, III et al. ........... 166/308 | 2004/0014607 A1 | 1/2004 | Sinclair et al. ............. 507/200 |
| 6,440,255 B1 | 8/2002 | Kohlhammer et al. ...... 156/283 | 2004/0014608 A1 | 1/2004 | Nguyen et al. ............. 507/200 |
| 6,446,727 B1 | 9/2002 | Zemlak et al. .............. 166/308 | 2004/0040706 A1 | 3/2004 | Hossaini et al. ............ 166/278 |
| 6,448,206 B1 | 9/2002 | Griffith et al. .............. 507/219 | 2004/0040708 A1 | 3/2004 | Stephenson et al. ...... 166/280.1 |
| 6,450,260 B1 | 9/2002 | James et al. ................. 166/277 | 2004/0040713 A1 | 3/2004 | Nguyen et al. ............. 166/295 |
| 6,454,003 B1 | 9/2002 | Chang et al. ................ 166/270 | 2004/0048752 A1 | 3/2004 | Nguyen et al. ............. 507/269 |
| 6,458,885 B1 | 10/2002 | Stengal et al. ............... 524/507 | 2004/0055747 A1 | 3/2004 | Lee ............................. 166/278 |
| 6,485,947 B1 | 11/2002 | Rajgarhia et al. ........... 435/139 | 2004/0106525 A1 | 6/2004 | Willbert et al. ............. 507/200 |
| 6,488,091 B1 | 12/2002 | Weaver et al. ............... 166/300 | 2004/0138068 A1 | 7/2004 | Rimmer et al. ............. 507/100 |
| 6,488,763 B1 | 12/2002 | Brothers et al. ............. 106/692 | 2004/0149441 A1 | 8/2004 | Nguyen et al. .......... 166/280.1 |
| 6,494,263 B1 | 12/2002 | Todd ........................... 166/312 | 2004/0152601 A1 | 8/2004 | Still et al. .................... 507/100 |
| 6,503,870 B1 | 1/2003 | Griffith et al. .............. 507/219 | 2004/0177961 A1 | 9/2004 | Nguyen et al. .......... 166/280.2 |
| 6,508,305 B1 | 1/2003 | Brannon et al. ............. 166/293 | 2004/0194961 A1 | 10/2004 | Nguyen et al. ............. 166/295 |
| 6,527,051 B1 | 3/2003 | Reddy et al. ................ 166/300 | 2004/0206499 A1 | 10/2004 | Nguyen et al ........... 166/280.2 |
| 6,528,157 B1 | 3/2003 | Hussain et al. ............. 428/325 | 2004/0211559 A1 | 10/2004 | Nguyen et al. ............. 166/276 |
| 6,531,427 B1 | 3/2003 | Shuchart et al. ............. 507/267 | 2004/0211561 A1 | 10/2004 | Nguyen et al. .......... 166/280.2 |
| 6,538,576 B1 | 3/2003 | Schultz et al. ............ 340/859.6 | 2004/0221992 A1 | 11/2004 | Nguyen et al. ............. 166/295 |
| 6,543,545 B1 | 4/2003 | Chatterji et al. ............. 166/381 | 2004/0231845 A1 | 11/2004 | Cooke, Jr. ................... 166/279 |
| 6,552,333 B1 | 4/2003 | Storm et al. ............. 250/269.3 | 2004/0231847 A1 | 11/2004 | Nguyen et al. ............. 166/295 |
| 6,554,071 B1 | 4/2003 | Reddy et al. ................ 166/293 | 2004/0256099 A1 | 12/2004 | Nguyen et al. ............. 166/249 |
| 6,555,507 B1 | 4/2003 | Chatterji et al. ............. 507/219 | 2004/0261995 A1 | 12/2004 | Nguyen et al. ............. 166/279 |
| 6,569,814 B1 | 5/2003 | Brady et al. ................. 507/201 | 2004/0261997 A1 | 12/2004 | Nguyen et al. ............. 166/281 |
| 6,582,819 B1 | 6/2003 | McDaniel et al. .......... 428/402 | 2005/0000731 A1 | 1/2005 | Nguyen et al ................. 175/57 |
| 6,593,402 B1 | 7/2003 | Chatterji et al. ................ 524/7 | 2005/0006093 A1 | 1/2005 | Nguyen et al. ............. 166/281 |
| 6,599,863 B1 | 7/2003 | Palmer et al. ............... 507/219 | 2005/0006096 A1 | 1/2005 | Nguyen et al. ............. 166/295 |
| 6,608,162 B1 | 8/2003 | Chiu et al. ................... 528/129 | 2005/0045326 A1 | 3/2005 | Nguyen ....................... 166/278 |
| 6,616,320 B1 | 9/2003 | Huber et al. .............. 366/156.2 | | | |
| 6,620,857 B1 | 9/2003 | Valet ............................. 522/42 | | | |

FOREIGN PATENT DOCUMENTS

| | | |
|---|---|---|
| 6,626,241 B1 | 9/2003 | Nguyen ....................... 166/278 |
| 6,632,527 B1 | 10/2003 | McDaniel et al. .......... 428/402 |
| 6,632,892 B1 | 10/2003 | Rubinsztajn et al. ....... 525/476 |
| 6,642,309 B1 | 11/2003 | Komitsu et al. ............. 525/100 |
| 6,648,501 B1 | 11/2003 | Huber et al. ................. 366/301 |
| 6,659,179 B1 | 12/2003 | Nguyen ....................... 166/227 |
| 6,664,343 B1 | 12/2003 | Narisawa et al. ............ 525/474 |
| 6,667,279 B1 | 12/2003 | Hessert et al. ............... 507/225 |
| 6,668,926 B1 | 12/2003 | Nguyen et al. .............. 166/280 |
| 6,669,771 B1 | 12/2003 | Tokiwa et al. ............. 106/162.7 |
| 6,681,856 B1 | 1/2004 | Chatterji et al. ............. 166/294 |
| 6,686,328 B1 | 2/2004 | Binder ......................... 510/446 |
| 6,705,400 B1 | 3/2004 | Nguyen et al. .............. 166/281 |
| 6,710,019 B1 | 3/2004 | Sawdon et al. .............. 507/136 |
| 6,713,170 B1 | 3/2004 | Kaneka et al. .............. 428/323 |
| 6,725,926 B1 | 4/2004 | Nguyen et al. ........... 166/254.1 |
| 6,725,931 B1 | 4/2004 | Nguyen et al. ........... 166/280.2 |
| 6,729,404 B1 | 5/2004 | Nguyen et al. ........... 166/280.2 |
| 6,732,800 B1 | 5/2004 | Acock et al. ................ 166/308 |
| 6,745,159 B1 | 6/2004 | Todd et al. .................... 703/10 |
| 6,749,025 B1 | 6/2004 | Brannon et al. .......... 166/305.1 |
| 6,763,888 B1 | 7/2004 | Harris et al. .............. 166/305.1 |
| 6,766,858 B1 | 7/2004 | Nguyen et al. .............. 166/300 |
| 6,776,236 B1 | 8/2004 | Nguyen ....................... 166/279 |
| 6,832,650 B1 | 12/2004 | Nguyen et al. .............. 166/279 |
| 6,851,474 B1 | 2/2005 | Nguyen ....................... 166/279 |
| 6,887,834 B1 | 5/2005 | Nguyen et al. .............. 507/221 |
| 2001/0016562 A1 | 8/2001 | Muir et al. ................... 507/201 |
| 2002/0043370 A1 | 4/2002 | Poe ......................... 166/250.07 |
| 2002/0048676 A1 | 4/2002 | McDaniel et al. .......... 428/404 |
| 2002/0070020 A1 | 6/2002 | Nguyen ....................... 166/295 |
| 2003/0006036 A1 | 1/2003 | Malone et al. ......... 166/250.12 |
| 2003/0060374 A1 | 3/2003 | Cooke, jr. ................... 507/200 |
| 2003/0114314 A1 | 6/2003 | Ballard et al. ............... 507/100 |
| 2003/0130133 A1 | 7/2003 | Vollmer ...................... 507/100 |

| | | |
|---|---|---|
| EP | 0313243 B1 | 10/1988 |
| EP | 0528595 A1 | 8/1992 |
| EP | 0510762 A2 | 11/1992 |
| EP | 0643196 A2 | 6/1994 |
| EP | 0 834 644 A2 | 4/1998 |
| EP | 0 853 186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1 132 569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1292718 | 10/1972 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 04/037946 A1 | 5/2004 |
| WO | WO 04/038176 A1 | 5/2004 |
| WO | WO 05/021928 A2 | 3/2005 |

OTHER PUBLICATIONS

U.S. Appl. No. 10/394,898, filed Mar. 21, 2003, Eoff et al.
U.S. Appl. No. 10/408,800, filed Apr. 7, 2003, Nguyen, et al.
U.S. Appl. No. 10/601,407, filed Jun. 23, 2003, Byrd et al.
U.S. Appl. No. 10/603,492, filed Jun. 25, 2003, Nguyen, et al.
U.S. Appl. No. 10/649,029, filed Aug. 27, 2003, Nguyen, et al.
U.S. Appl. No. 10/650,063, filed Aug. 26, 2003, Nguyen.
U.S. Appl. No. 10/650,064, filed Aug. 26, 2003, Nguyen, et al.
U.S. Appl. No. 10/650,065, filed Aug. 26, 2003, Nguyen.
U.S. Appl. No. 10/659,574, filed Sep. 10, 2003, Nguyen, et al.
U.S. Appl. No. 10/727,365, filed Dec. 4, 2003, Reddy, et al.
U.S. Appl. No. 10/751,593, filed Jan. 5, 2004, Nguyen.
U.S. Appl. No. 10/775,347, filed Feb. 10, 2004, Nguyen.
U.S. Appl. No. 10/791,944, filed Mar. 3, 2004, Nguyen.
U.S. Appl. No. 10/793,711, filed Mar. 5, 2004, Nguyen et al.
U.S. Appl. No. 10/852,811, filed May 25, 2004, Nguyen.
U.S. Appl. No. 10/853,879, filed May 26, 2004, Nguyen et al.
U.S. Appl. No. 10/860,951, filed Jun. 4, 2004, Stegent, et al.
U.S. Appl. No. 10/861,829, filed Jun. 4, 2004, Stegent, et al.
U.S. Appl. No. 10/862,986, filed Jun. 8, 2004, Nguyen, et al.
U.S. Appl. No. 10/864,061, filed Jun. 9, 2004, Blauch, et al.
U.S. Appl. No. 10/864,618, filed Jun. 9, 2004, Blauch, et al.
U.S. Appl. No. 10/868,593. filed Jun. 15, 2004, Nguyen, et al.
U.S. Appl. No. 10/868,608, filed Jun. 15, 2004, Nguyen, et al.
U.S. Appl. No. 10/937,076, filed Sep. 9, 2004, Nguyen, et al.
U.S. Appl. No. 10/944,973, filed Sep. 20, 2004, Nguyen, et al.
U.S. Appl. No. 10/972,648, filed Oct. 25, 2004, Dusterhoft, et al.
U.S. Appl. No. 10/977,673, filed Oct. 29, 2004, Nguyen.
U.S. Appl. No. 11/009,277, filed Dec. 08, 2004, Welton, et al.
U.S. Appl. No. 11/011,394, filed Dec. 12, 2004, Ngyuen, et al.
U.S. Appl. No. 11/035,833, filed Jan. 14, 2005, Nguyen.
U.S. Appl. No. 11/049,252, filed Feb. 2, 2005, Van Batenburg, et al.
U.S. Appl. No. 11/053,280, filed Dec. 8, 2005, Nguyen.
U.S. Appl. No. 11/056,635, filed Feb. 11, 2005, Dusterhoft, et al.
Halliburton, *CoalStim$^{SM}$ Service, Helps Boost Cash Flow From CBM Assets*, Stimulation, HO3679 10/03, 2003, Halliburton Communications.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.
Halliburton, *Expedite® Service, A Step-Change Improvement Over Conventional Proppant Flowback Control Systems. Provides Up to Three Times the Conductivity of RCPs.*, Stimulation, HO3296 05/04, 2004, Halliburton Communications.
Halliburton Technical Flier—Multi Stage Frac Completion Methods, 2 pages.
Halliburton *"CobraFrac$^{SM}$ Service, Coiled Tubing Fracturing—Cost-Effective Method for Stimulating Untapped Reserves"*, 2 pages.

Halliburton *"CobraJetFrac$^{SM}$ Service, Cost-Effective Technology That Can Help Reduce Cost per BOE Produced, Shorten Cycle time and Reduced Capex"*.
Halliburton Cobra Frac Advertisement.
Halliburton *"SurgiFrac$^{SM}$ Service, a Quick and cost-Effective Method to Help Boost Production From Openhole Horizonal Completions"*.
Halliburton, *SandWedge® NT Conductivity Enhancement System, Enhances Proppant Pack Conductivity and Helps Prevent Intrusion of Formation Material for Improved Long-Term Production*, Stimulation, HO2289 05/04, 2004, Halliburton Communications.
Almond et al., *Factors Affecting Proppant Flowback With Resin Coated Proppants*, SPE 30096, pp. 171-186.
SPE 15547, *Field Application of Lignosulfonate Gels To Reduce Channeling*, South Swan Hills Miscible Unit, Alberta, Canada, by O.R. Wagner et al, 1986.
Owens et al., *Waterflood Pressure Pulsing for Fractured Reservoirs* SPE 1123, 1966.
Felsenthal et al., *Pressure Pulsing—An Improved Method of Waterflooding Fractured Reservoirs* SPE 1788, 1957.
Raza, *"Water and Gas Cyclic Pulsing Method for Improved Oil Recovery"*, SPE 3005, 1971.
Peng et al., *"Pressure Pulsing Waterflooding in Dual Porosity Naturally Fractured Reservoirs"* SPE 17587, 1988.
Dusseault et al, *"Pressure Pulse Workovers in Heavy Oil"*, SPE 79033, 2002.
Yang et al., *"Experimental Study on Fracture Initiation By Pressure Pulse"*, SPE 63035, 2000.
Kazakov et al., *"Optimizing and Managing Coiled Tubing Frac Strings"* SPE 60747, 2000.
Advances in Polymer Science, vol. 157, *"Degradable Aliphatic Polyesters"* edited by A.-C. Alberston, 2001.
Gorman, *Plastic Electric: Lining up the Future of Conducting Polymers* Science News, vol. 163, May 17, 2003.
Gidley et al., *"Recent Advances in Hydraulic Fracturing,"* Chapter 6, pp. 109-130, 1989.
Simmons et al., *"Poly(phenyllactide): Synthesis, Characterization, and Hydrolytic Degradation, Biomacromolecules"*, vol. 2, No. 2, pp. 658-663, 2001.
Yin et al., *"Preparation and Characterization of Substituted Polylactides"*, Americal Chemical Society, vol. 32, No. 23, pp. 7711-7718, 1999.
Yin et al., *"Synthesis and Properties of Polymers Derived from Substituted Lactic Acids"*, American Chemical Society, Ch. 12, pp. 147-159, 2001.
Cantu et al., *"Laboratory and Field Evaluation of a Combined Fluid-Loss Control Additive and Gel Breaker for Fracturing Fluids,"* SPE 18211, 1990.
Love et al., *"Selectivity Placing Many Fractures in Openhole Horizontal Wells Improves Production"*, SPE 50422, 1998.
McDaniel et al. *"Evolving New Stimulation Process Proves Highly Effective In Level 1 Dual-Lateral Completion"* SPE 78697, 2002.
Albertsson et al., *"Aliphatic Polyesters: Synthesis, Properties and Applications"*, Advances in Polymer Science, vol. 57 Degradable Aliphatic Polyesters, 2002.
Dechy-Cabaret et al., *"Controlled Ring-Operated Polymerization of Lactide and Glycolide"* American Chemical Society, Chemical Reviews, A-Z, AA-AD, 2004.
Funkhouser et al., *"Synthetic Polymer Fracturing Fluid For High-Temperature Applications"*, SPE 80236, 2003.
*Chelating Agents*, Encyclopedia of Chemical Technology, vol. 5 (764-795).

Vichaibun et al., *"A New Assay for the Enzymatic Degradation of Polylactic Acid, Short Report"*, ScienceAsia, vol. 29, pp. 297-300, 2003.

CDX Gas, CDX Solution, 2003, CDX, LLC, Available @www.cdxgas.com/solution.html, printed pp. 1-2.

CDX Gas, *"What is Coalbed Methane?"* CDX, LLC. Available @www.cdxgas.com/what.html, printed p. 1.

Halliburton brochure entitled "H2Zero™ Service Introducing The Next Generation of cost-Effective Conformance Control Solutions", 2002.

Halliburton brochure entitled INJECTROL® A Component:, 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages.

Foreign search report and opinion (CPW 21582 EP), Mar. 11, 2005.

Foreign Search Report And Opinion (PCT Appl. No. GB2004/002968), Nov. 16, 2004.

"A Novel Approach for Enhancing Proppant Consolidation: Laboratory Testing and Field Applications," Society of Professional Engineers Paper Number 77748, published in 2002, P.D. Nguyen, J.D. Weaver, M. Parker, M. Hoogteijling, and M.J. van der Horst.

"New Guidelines for Applying Curable Resin-Coated Proppants," Society of Professional Engineers Paper Number 39582, published in 1997, P.D. Nguyen, R.G. Dusterhoft, B.T. Dewprashad, and J.D. Weaver.

* cited by examiner

METHODS FOR ENHANCING THE CONSOLIDATION STRENGTH OF RESIN COATED PARTICULATES

BACKGROUND OF THE INVENTION

1. Field of the Invention

The present invention involves enhancing the conductivity of subterranean propped fractures penetrating formations while controlling proppant flowback. More particularly, the present invention relates to improved consolidation performance of resin-coated proppants and their use in controlling proppant flowback.

2. Description of Related Art

A subterranean formation may be treated to increase its conductivity by hydraulically fracturing the formation to create or enhance one or more cracks or "fractures." Such hydraulic fracturing is usually accomplished by injecting a viscous fracturing fluid into the subterranean formation at a rate and pressure sufficient to cause the formation to break down and produce one or more fractures. The fracture or fractures may be horizontal or vertical, with the latter usually predominating, and with the tendency toward vertical fractures increasing with the depth of the formation being fractured. The fracturing fluid is generally a highly viscous gel, emulsion, or foam that may comprise a particulate material often referred to as proppant. In some fracturing operations, commonly known as "water fracturing" operations, the fracturing fluid viscosity is somewhat lowered and yet the proppant remains in suspension because the fracturing fluid is injected into the formation at a substantially higher velocity. Whether a highly viscous fluid is used or a less viscous fluid with a higher velocity, proppant is deposited in the fracture and functions, inter alia, to hold the fracture open while maintaining conductive channels through which produced fluids can flow upon completion of the fracturing treatment and release of the attendant hydraulic pressure.

In order to prevent the subsequent flowback of proppant and other unconsolidated particulates with the produced fluids a portion of the proppant introduced into the fractures may be coated with a hardenable resin composition. When the fracturing fluid, which is the carrier fluid for the proppant, reverts to a thin fluid the resin-coated proppant is deposited in the fracture, and the fracture closes or partially closes on the proppant. Such fractures apply pressure on the resin-coated proppant particles, causing the particles to be forced into contact with each other while the resin composition hardens. The hardening of the resin composition under pressure brings about the consolidation of the resin-coated proppant particles into a hard permeable mass having compressive and tensile strength that hopefully prevents unconsolidated proppant and formation sand from flowing out of the fractures with produced fluids. Flowback of the proppant or formation fines with formation fluids is undesirable as it may erode metal equipment, plug piping and vessels, and cause damage to valves, instruments, and other production equipment, and ultimately reduce the potential production of the well.

Most of the resin on resin pre-coated proppant is already cured. This partially cured resin needs to be softened either by temperature or an activator (as in the case of low temperature wells) so that the resin can be wedged together as the resin coated proppant grains contact one another. In addition to the softening effect of resin coated on the proppant, closure stress is required to cause grain-to-grain contact. Without grain-to-grain contact, adequate consolidation of proppant pack generally will not occur.

SUMMARY OF THE INVENTION

The present invention involves enhancing the conductivity of subterranean propped fractures penetrating formations while controlling proppant flowback. More particularly, the present invention relates to improved consolidation performance of resin-coated proppants and their use in controlling proppant flowback.

Some embodiments of the present invention provide methods of controlling proppant flowback from a fracture in a subterranean zone comprising the steps of providing resin coated proppant; providing tackifying composition; coating the tackifying composition onto at least a portion of the resin coated proppant to create tackified resin coated proppant; introducing the tackified resin coated proppant into a subterranean fracture; and, allowing the tackified resin coated proppant to substantially cure.

Other embodiments of the present invention provide methods of fracturing a subterranean formation comprising the steps of providing a fracturing fluid; placing the fracturing fluid into a subterranean formation at a pressure sufficient to create or extend at least one fracture therein; providing tackified resin coated proppant: placing the tackified resin coated proppant into the subterranean fracture; and, allowing the tackified resin coated proppant to substantially cure.

The objects, features and advantages of the present invention will be readily apparent to those skilled in the art upon a reading of the description of preferred embodiments that follows.

DESCRIPTION OF PREFERRED EMBODIMENTS

The present invention involves enhancing the conductivity of subterranean propped fractures penetrating formations while controlling proppant flowback. More particularly, the present invention relates to improved consolidation performance of resin-coated proppants and their use in controlling proppant flowback.

The methods of the present invention act, inter alia, to enhance the consolidation strength of resin coated proppant (hereinafter "RCP"). RCP is a proppant material that is coated with resin and allowed to partially cure so that it can be, e.g., conveniently stored and transported. Some embodiments of the methods of the present invention comprise coating a tackifying material onto RCP and then using that tackified RCP in a subterranean application such as hydraulic fracturing, frac-packing or vent-screen gravel packing.

Proppant particles used in accordance with the present invention to create RCP are generally of a size such that formation particulates that may migrate with produced fluids are prevented from being produced from the subterranean zone. Any suitable proppant may be used, including graded sand, bauxite, ceramic materials, glass materials, walnut hulls, polymer beads and the like. Generally, the proppant particles have a size in the range of from about 4 to about 400 mesh, U.S. sieve series. In some embodiments of the present invention, the proppant is graded sand having a particle size in the range of from about 10 to about 70 mesh, U.S. Sieve Series. Suitable commercially available RCP materials include but are not limited to pre-cured resin-coated sand, curable resin-coated sand, curable resin-coated ceramics, single-coat, dual-coat, or multi-coat resin coated sand, ceramic, or bauxite. Some examples available from Borden Chemical, Columbus, Ohio, are "XRT™ CERAMAX P," "CERAMAX I," "CERAMAX P," "ACFRAC BLACK," "ACFRAC CR," "ACFRAC SBC," "ACFRAC SB," and "ACFRAC LTC." Some examples available from Santrol, Fresno, Tex., are "HYPERPROP G2," "DYNAPROP G2," "MAGNAPROP G2," "OPTIPROP G2," "SUPER HS," "SUPER DC," "SUPER LC," and "SUPER HT."

Compositions suitable for use as tackifying compounds in the present invention comprise any compound that, when in liquid form or in a solvent solution, will form a non-hardening coating upon a RCP. A particularly preferred group of tackifying compounds comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride and acrylic acid and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be utilized as tackifying compounds include liquids and solutions of, for example, polyesters, polycarbonates and polycarbamates, natural resins such as shellac and the like. Suitable tackifying compounds are described in U.S. Pat. No. 5,853,048 issued to Weaver, et al. and U.S. Pat. No. 5,833,000 issued to Weaver, et al., the relevant disclosures of which are herein incorporated by reference.

In some embodiments of the present invention, the RCP is coated with a tackifying compound on-the-fly. The term "on-the-fly" is used herein to mean that a flowing stream is continuously introduced into another flowing stream so that the streams are combined and mixed while continuing to flow as a single stream as part of the on-going treatment. Such mixing can also be described as "real-time" mixing. On-the-fly mixing, as opposed to batch or partial batch mixing, may reduce waste and simplify subterranean treatments. This is due, in part, to the fact that if the components are mixed and then circumstances dictate that the subterranean treatment be stopped or postponed, the mixed components may quickly become unusable. By having the ability to rapidly shut down the mixing of streams on-the-fly, such waste can be avoided, resulting in, inter alia, increased efficiency and cost savings.

FIG. 1 illustrates one embodiment of an on-the-fly mixing method of the present invention. Container 10 holds particulate matter such as RCP. Conveyance means 11 can be any means known in the art for conveying particulate material, in one embodiment of the present invention, conveyance means 11 comprises a conveyor belt or a sand screw. Conveyance means 11 transports proppant to container 30. Container 20 holds tackifying compound and line 21 transports the tackifying compound to container 30. Control of the total and relative amounts of tackifying compound is achieved through the use of valve 22 on line 21 and of RCP through the control of conveyance means 11. Inside container 30, the particles from container 10 are coated with tackifying agent from container 20 to form tackified RCP. The coated particles exit container 30 via conveyance means 31. Where conveyance means 31 is a sand screw, the RCP may be coated with the tackifying agent by the auger action of the sand screw itself Where it is desirable to immediately use the tackified RCP in a subterranean treatment, it may be transported by conveyance means 31 directly from container 30 to blender tub 40. In one embodiment, the transport of tackified RCP from container 30 to blender tub 40 is computer-controlled to ensure accurate metering and to allow for a rapid shutdown of on-the-fly mixing when necessary. Also transported to blender tub 40 is a servicing fluid, such as a fracturing fluid or gravel packing fluid, from container 50 through transport line 51. The servicing fluid from container 50 may be transported to blender tub 40 by any means known in the art. In one embodiment, the transport of servicing fluid from container 50 to blender tub 40 is computer-controlled to ensure accurate metering and to allow for a rapid shutdown of on-the-fly mixing when necessary. Such computer control may be achieved, in part, by making valve 52 a computer-controlled valve. Inside blender tub 40, the servicing fluid is substantially mixed with tackified RCP to form a blended composition suitable for use in subterranean fractures.

When the tackified RCP of the present invention is used in a subterranean fracturing operation, any fracturing fluid known in the art may be used, including viscosified treatment fluids, aqueous gels, emulsions, and other suitable fracturing fluids. Where used, the aqueous gels are generally comprised of water and one or more gelling agents. Also, where used, the emulsions may be comprised of two or more immiscible liquids such as an aqueous gelled liquid and a liquefied, normally gaseous fluid, such as nitrogen. The preferred fracturing fluids for use in accordance with this invention are aqueous gels comprised of water, a gelling agent for gelling the water and increasing its viscosity, and optionally, a cross-linking agent for cross-linking the gel and further increasing the viscosity of the fluid. The increased viscosity of the gelled or gelled and cross-linked fracturing fluid, inter alia, reduces fluid loss and allows the fracturing fluid to transport significant quantities of suspended proppant particles. The fracturing fluids may also include one or more of a variety of well-known additives such as breakers, stabilizers, fluid loss control additives, clay stabilizers, bactericides, and the like.

The methods of the present invention may be particularly useful in situations where the subterranean formation places little or no closure stress on resin coated proppant placed therein. Industry research has shown that hydraulic fractures may not completely close during the first 24 hours after a hydraulic fracture stimulation treatment. In fact, some fractures may not completely close for ninety days or longer. Such slow closing of the fractures affects the ultimate consolidation strength of resin coated proppant packs because without the application of closure stress, the grain-to-grain contact may be insufficient to effect consolidation. In that situation, once the closure stress is applied, the resin coating the proppant may have already cured.

The tackifying composition may act, inter alia, to enhance the grain-to-grain contacts between individual RCP particles. Moreover, the tackifying composition is believed to soften the partially cured resin on the RCP. This dual action of the tackifying composition may improve the final consolidation strength of a proppant pack made using the tackified RCP of the present invention.

In one embodiment of the methods of the present invention, RCP is substantially coated with a tackifying composition to form tackified RCP. The tackified RCP is then placed in a subterranean zone having one or more fractures therein and allowed to cure and consolidate into one or more high-strength permeable packs.

To facilitate a better understanding of the present invention, the following examples of some of the preferred embodiments are given. In no way should such examples be read to limit the scope of the invention.

EXAMPLES

Example 1

Uncoated (control) RCP material was mixed with various fracturing fluids, stirred, and then packed into a brass chamber and allowed to cure with no applied pressure and, after a period of time, the unconfined compressive strength was determined. The same procedure was followed for the same RCP coated with SandWedge™ NT tackifying composition that is commercially available from Halliburton Corporation, Houston Tex.

TABLE 1

Effect of Cure Tackifying Agent on RCP Consolidation Strength

| Amount of tackifying agent (% volume/ weight) on RCP | Fracturing Fluid | Stir Time (minutes) | Cure time | Unconfined Compressive Strength (psi) |
|---|---|---|---|---|
| 0% on 20/40 RCP | 30# Linear Carboxymethyl Guar (CMG) | 60 | 1 hr at 300° F. | 85 |
| 2% on 20/40 RCP | 30# Linear CMG | 60 | 1 hr at 300° F. | 325 |
| 2% on 20/40 RCP | 30# Linear CMG | 0 | 1 hr at 300° F. | 280 |
| 2% on 20/40 RCP | 30# Linear CMG | 0 | 3 hrs at 300° F. | 330 |
| 2% on 20/40 RCP | 30# Linear CMG | 0 | 20 hrs at 300° F. | 355 |
| 0% on 20/40 RCP | 30# Crosslinked CMG | 60 | 1 hr at 300° F. | 50 |
| 2% on 20/40 RCP | 30# Crosslinked CMG | 60 | 1 hr at 300° F. | 450 |
| 0% on 16/30 RCP | 35# Linear Hydropropyl guar (HPG) | 0 | 24 hrs at 250° F. | 0 |
| 2% on 16/30 RCP | 35# Linear HPG | 0 | 24 hrs at 250° F. | 90 |

The results in Table 1 illustrate that proppant packs created from RCP coated with a tackifying composition yield compressive strengths higher than proppant packs created from uncoated RCP.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of controlling proppant flowback from a fracture in a subterranean zone comprising the steps of:
   providing resin coated proppant;
   providing tackifying composition;
   contacting the tackifying composition with at least a portion of the resin coated proppant to create tackified resin coated proppant;
   introducing the tackified resin coated proppant into a subterranean fracture; and
   allowing the tackified resin coated proppant to substantially cure.

2. The method of claim 1 wherein the resin coated proppant is selected from the group consisting of pre-cured resin-coated sand, curable resin-coated sand, curable resin-coated ceramics, single-coat resin coated sand, dual-coat resin coated sand, multi-coat resin coated sand, single-coat resin coated ceramics, dual-coat resin coated ceramics, multi-coat resin coated ceramics, single-coat resin coated bauxite, dual-coat resin coated bauxite, multi-coat resin coated bauxite, and combinations thereof.

3. The method of claim 1 wherein the tackifying composition is selected from the group consisting of polyamides, polyesters, polycarbonates, polycarbamates, natural resins, and combinations thereof.

4. The method of claim 1 wherein the tackifying composition is contacted with the resin coated proppant on-the-fly.

5. A method of fracturing a subterranean formation comprising the steps of:
   providing a fracturing fluid;
   placing the fracturing fluid into a subterranean formation at a pressure sufficient to create or extend at least one fracture therein;
   providing tackified resin coated proppant:
   placing the tackified resin coated proppant into the subterranean fracture; and
   allowing the tackified resin coated proppant to substantially cure.

6. The method of claim 5 wherein the resin coated proppant is selected from the group consisting of pre-cured resin-coated sand, curable resin-coated sand, curable resin-coated ceramics, single-coat resin coated sand, dual-coat resin coated sand, multi-coat resin coated sand, single-coat resin coated ceramics, dual-coat resin coated ceramics, multi-coat resin coated ceramics, single-coat resin coated bauxite, dual-coat resin coated bauxite, multi-coat resin coated bauxite, and combinations thereof.

7. The method of claim 5 wherein the tackified resin coated proppant was formed by contacting a tackifying composition with at least a portion of the resin coated proppant, the tackifying composition being selected from group consisting of polyamides, polyesters, polycarbonates, polycarbamates, natural resins, and combinations thereof.

8. The method of claim 7 wherein the tackifying composition is contacted with the resin coated proppant on-the-fly.

* * * * *